3,402,172
3 - LOWER ALKOXY - 17α - (3 - SUBSTITUTED - 5-ISOXAZOLYL) ESTRA-1,3,5(10)-TRIEN-17β-OLS
Townley P. Culbertson, Ann Arbor, Mich., assignor to Parke, Davis & Company, Detroit, Mich., a corporation of Michigan
No Drawing. Filed Jan. 12, 1966, Ser. No. 520,067
8 Claims. (Cl. 260—239.55)

The present invention relates to new steroid compounds. More particularly, the invention relates to new 3-lower alkoxy-17α-(3 - substituted - 5-isoxazolyl)estra-1,3,5(10)-trien-17β-ol compounds which can be represented by the formula

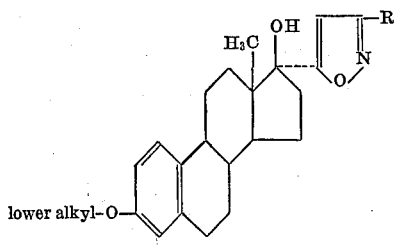

and to methods for their production; where R represents lower alkyl, phenyl, lower alkoxycarbonyl, or carboxyl. When R represents carboxyl it can represent the carboxyl group in free acid form or in the form of a salt with a cation, especially a pharmaceutically-acceptable cation such as sodium, potassium, ammonium or substituted ammonium. The lower alkyl and lower alkoxy groups are preferably those containing not more than 4 carbon atoms.

In accordance with the invention, compounds of the formula

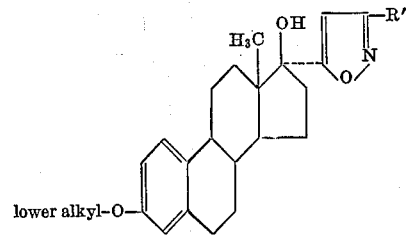

can be produced by reacting a 17α-ethynylestradiol 3-lower alkyl ether of the formula

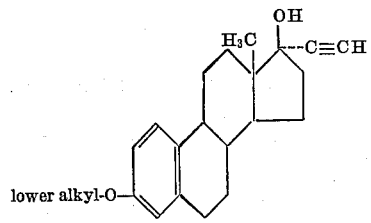

with a hydroxamoyl halide of the formula

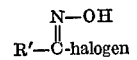

or a nitrile oxide of the formula

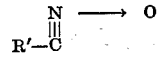

where R' represents lower alkyl, phenyl, or lower alkoxycarbonyl. In the hydroxamoyl halides the preferred halogen is chlorine. The hydroxamoyl halides and nitrile oxides are equivalent materials for use in the process of the invention as it is considered that the hydroxamoyl halide generates the nitrile oxide by dehydrohalogenation during the course of the reaction. In general, the hydroxamoyl halides are more stable and are easier to handle than the nitrile oxides and thus they are the preferred starting materials.

The foregoing process is preferably carried out in the presence of a base such as pyridine, triethylamine, aqueous sodium carbonate, or aqueous sodium hydroxide, although it can also be carried out without the use of a base. Some suitable solvents for the reaction are aromatic hydrocarbons such as benzene and toluene; chlorinated hydrocarbons such as methylene chloride and chloroform; ethers such as tetrahydrofuran, diethyl ether, and diethylene glycol dimethyl ether; ethyl acetate; lower alkanols; and tertiary amides such as dimethylformamide and N,N-dimethylacetamide. The reactants can be used in approximately equimolar quantities but preferably a considerable excess of the hydroxamoyl halide or nitrile oxide is used to facilitate complete conversion of the steroid starting material. The reaction can be carried out at temperatures from about 0 to 150° C., a temperature of about 15 to 30° C. being preferred when a base is used and a temperature in excess of 100° C. being preferred when a base is not used. Under the preferred conditions as indicated, the reaction is normally substantially complete within a period of less than 72 hours.

When the product resulting from the foregoing process contains a lower alkoxycarbonyl group (represented by R') it can be converted to carboxyl by subsequent hydrolysis. The hydrolysis can be carried out by reacting the product with either an acidic or basic aqueous medium. The preferred method of hydrolysis is by treating the product with sodium hydroxide or potassium hydroxide in an aqueous lower alkanol until hydrolysis is substantially complete. The product is isolated directly as a carboxylate salt or, following acidification, as the free carboxylic acid. The carboxylic acid can be converted to any desired salt by reaction with a base such as an alkali metal hydroxide, carbonate, or bicarbonate, ammonia, or an amine.

The compounds of the invention are useful as pharmacological agents and as chemical intermediates. As pharmacological agents they exhibit hypocholesteremic and antifertility activities. Their activity as hypocholesteremic agents can be measured quantitatively by administering a test compound to standard experimental animals for a period of time and observing the decrease in serum cholesterol from the control level. A representative compound of the invention, 3-methoxy-17α-(3-methyl-5-isoxazolyl)estra-1,3,5(10)-trien-17β-ol, causes a substantial decrease in serum cholestrol with little evidence of inhibition of weight gain. The compounds of the invention are active upon oral administration but can also be given by the parenteral route if desired.

The invention is illustrated by the following examples.

EXAMPLE 1

Over a period of 10 minutes, 1.4 g. of acethydroxamoyl chloride is added to a solution of 5 g. of 3-methoxy-17α-ethynyl-estra-1,3,5(10)-trien-17β-ol and 15 ml. of triethylamine in 200 ml. of ether. At the end of 1, 24 and 48 hours additional 1.4 g. portions of acethydroxamoyl chloride are added. After one more day, triethylamine hydrochloride is removed by filtration and the filtrate is concentrated to a volume of 100 ml. and refrigerated. The insoluble product is collected on a filter. It is 3-methoxy-17α - (3-methyl-5-isoxazolyl)estra-1,3,5(10)-trien-17β-ol; M.P. 161.5–162.5° C. following crystallizations from ether.

By the foregoing procedure, with the substitution of an equivalent amount of propionhydroxamoyl chloride for the acethydroxamoyl chloride, the product obtained is 3 - methoxy-17α-(3-ethyl-5-isoxazolyl)estra-1,3,5(10)-trien-17β-ol.

EXAMPLE 2

Over a period of 6 hours, a solution of 6 g. of benzhydroxamoyl chloride in 100 ml. of ether is added to a solution of 6 g. of 3-methoxy-17α-ethynylestra-1,3,5(10)-trien-17β-ol and 6 ml. of triethylamine in 400 ml. of ether. The reaction mixture is stirred during the addition and for an additional 18 hours. The mixture is then filtered and the filtrate is washed with 5% hydrochloric acid and with water, dried and evaporated to give a residue of 3-methoxy - 17α-(3-phenyl-5-isoxazolyl)estra-1,3,5(10)-trien-17β-ol. For purification, the product is redissolved in ether and the solution chromatographed on a column prepared with 200 g. of magnesium silicate. The column is eluted with portions of ether and the eluates are diluted with petroleum ether to yield a crystalline product; M.P. 126–127° C.

By the foregoing procedure, with the substitution of an equivalent amount of 3 - ethoxy - 17α - ethynylestra-1,3,5(10)-trien-17β-ol for the 3-methoxy-17α-ethynylestra-1,3,5(10)-trien-17β-ol, the product obtained is 3-ethoxy - 17α - (3-phenyl-5-isoxazolyl)estra-1,3,5(10)-trien-17β-ol.

EXAMPLE 3

A solution of 6 g. of 3-methoxy-17α-ethynylestra-1,3,5(10)-trien-17β-ol, 5.5 g. of ethyl chloroximinoacetate of the formula

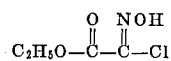

and 300 ml. of toluene is heated under reflux for 40 hours in a nitrogen atmosphere. The reaction mixture is concentrated under reduced pressure to give a residue of 3-methoxy - 17α-(3-ethoxycarbonyl-5-isoxazolyl)estra-1,3,5(10)-trien-17β-ol. For purification, the product is dissolved in a mixture of benzene and petroleum ether and the solution is chromatographed on a column prepared from 200 g. of alumina. Woelm neutral alumina (Grade III) can be used. The column is eluted with mixtures of benzene and petroleum ether and then with mixtures of benzene and ether and the individual eluates are evaporated to recover the product; M.P. 128–129° C. following crystallization from benzene-hexane.

EXAMPLE 4

A solution of 1.2 g. of 3-methoxy-17α-(3-ethoxycarbonyl - 5 - isoxazolyl)estra-1,3,5(10)-trien-17β-ol, 50 ml. of methanol, and 20 ml. of 25% aqueous sodium hydroxide is held at 25° C. for 2 and ½ hours and then diluted with 300 ml. of water. The mixture is heated until all of the sodium salt is in solution and it is then filtered. The filtrate is acidified with dilute hydrochloric acid and cooled and the insoluble product is collected on a filter. It is 3 - methoxy-17α-(3-carboxy-5-isoxazolyl)estra-1,3,5(10)-trien-17β-ol; M.P. 182–182.5° C. following crystallization from aqueous methanol. By reaction with sodium hydroxide, potassium carbonate, ethanolamine, or choline the product is converted respectively to the sodium, potassium, ethanolamine or choline salt.

I claim:
1. A compound of the formula

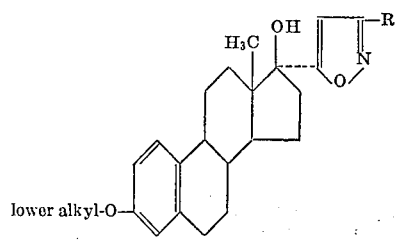

where R is a member of the class consisting of lower alkyl, phenyl, lower alkoxycarbonyl, and carboxyl.

2. A compound according to claim 1 which is 3-methoxy - 17α - (3-methyl-5-isoxazolyl)estra-1,3,5(10)-trien-17β-ol.

3. A compound according to claim 1 which is 3-methoxy - 17α - (3-phenyl-5-isoxazolyl)estra-1,3,5(10)-trien-17β-ol.

4. A compound according to claim 1 which is 3-methoxy - 17α - (3 - ethoxycarbonyl-5-isoxazolyl)estra-1,3,5(10)-trien-17β-ol.

5. A compound according to claim 1 which is 3-methoxy - 17α - (3-carboxy-5-isoxazolyl)estra-1,3,5(10)-trien-17β-ol.

6. Process for the production of compounds of the formula

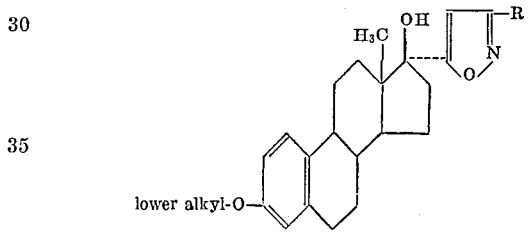

which comprises reacting a compound of the formula

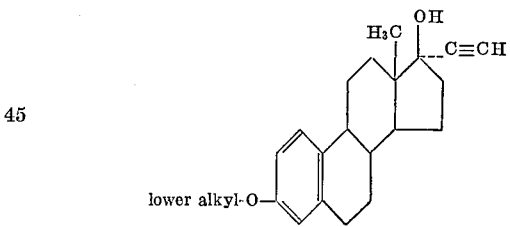

with a member of the class consisting of compounds of the formula

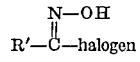

and compounds of the formula

where R' is a member of the class consisting of lower alkyl, phenyl, and lower alkoxycarbonyl.

7. Process according to claim 6 wherein the reaction is carried out in the presence of a base.

8. Process according to claim 6 wherein R' represents lower alkoxycarbonyl and R' in the reaction product is subsequently hydrolyzed to carboxyl.

References Cited
UNITED STATES PATENTS 3,313,809    4/1967    Clinton et al. _____ 260—239.55

H. A. FRENCH, *Primary Examiner.*